United States Patent
Xiao et al.

(10) Patent No.: US 10,268,611 B2
(45) Date of Patent: Apr. 23, 2019

(54) INPUT/OUTPUT (I/O) BINDING WITH AUTOMATIC INTERNATIONAL ELECTROMECHANICAL COMMISSION (IEC) ADDRESS GENERATION IN REMOTE TERMINAL UNIT (RTU) CONFIGURATION

(71) Applicant: Honeywell International, Inc., Morris Plains, NJ (US)

(72) Inventors: Li Xiao, Shanghai (CN); Danhua Zhang, Shanghai (CN); Changqiu Wang, Shanghai (CN); Shuang Liang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 379 days.

(21) Appl. No.: 15/046,308

(22) Filed: Feb. 17, 2016

(65) Prior Publication Data
US 2017/0235691 A1    Aug. 17, 2017

(51) Int. Cl.
| | |
|---|---|
| G06F 13/36 | (2006.01) |
| G06F 13/28 | (2006.01) |
| G05B 15/02 | (2006.01) |
| G05B 19/05 | (2006.01) |
| G06F 8/41 | (2018.01) |
| G05B 19/042 | (2006.01) |

(52) U.S. Cl.
CPC ............. *G06F 13/28* (2013.01); *G05B 15/02* (2013.01); *G05B 19/0426* (2013.01); *G05B 19/056* (2013.01); *G06F 8/441* (2013.01); G05B 2219/25201 (2013.01); G05B 2223/06 (2018.08)

(58) Field of Classification Search
CPC .. G05B 15/02; G05B 19/0426; G05B 19/056; G05B 2219/13; G05B 2219/25201; G06F 13/28; G06F 8/441
See application file for complete search history.

(56) References Cited

U.S. PATENT DOCUMENTS

| | | | |
|---|---|---|---|
| 8,372,316 B2 | 2/2013 | Kamikatano et al. | |
| 9,075,959 B2 | 7/2015 | Chouinard et al. | |
| 9,389,604 B2 | 7/2016 | Jeschin | |
| 2015/0278144 A1 | 10/2015 | McLaughlin et al. | |

OTHER PUBLICATIONS

Amplicon, "KW Multiprog IEC-61131-3 SoftLogic Control Software", http://www.amplicon.com, Oct. 7, 2009, 2 pages.
Amplicon, "Multiprog, ProConOS, KW Software", http://www.amplicon.com, Oct. 7, 2009, 11 pages.
Trio Motion Technology, "Getting Started with IEC 61131", http://www.triomotion.com, Mar. 23, 2012, 14 pages.
(Continued)

*Primary Examiner* — Idriss N Alrobaye
*Assistant Examiner* — Richard B Franklin

(57) ABSTRACT

A method includes automatically assigning, by at least one processor, an IEC address to an I/O binding variable for an RTU. This includes identifying a type of the I/O binding variable and identifying a size of the I/O binding variable based on the identified type. The size represents a number of memory locations to be used to store the I/O binding variable in at least one memory of the RTU. This also includes, in response to determining that the at least one memory contains a free space to store the I/O binding variable based on the identified size, assigning the IEC address identifying the free space to the I/O binding variable.

20 Claims, 8 Drawing Sheets

(56) References Cited

OTHER PUBLICATIONS

John M. Tiegelkamp, "2 Building Blocks of IEC 611131-3", IEC 61131-3: Programming Industrial Automation Systems, 2nd Ed., Springer-Verlag Berlin Heidelberg, 2010, 46 pages.
European Search Report dated Aug. 11, 2017 in connection with European Patent Application No. 17 15 2943.
Dariusz Rzonca et al., "Interfacing Inputs and Outputs with IEC 61131-3 Control Software", AISC, vol. 267, 2014, 10 pages.
Markus Simros et al., "Programming Embedded Devices in IEC 61131—Languages with Industrial PLC Tools Using PLCopen XML", 10th Portuguese Conference on Automatic Control, Jul. 16-18, 2012, 7 pages.
KW Software, "Multiprog Quick Start Guide", 2002, 76 pages.

FIG. 3B-2

| | 320c | 320d | | | | | | |
|---|---|---|---|---|---|---|---|---|
| | Usage | Description | Address | Init | Retain | PDD | OPC | TB |
| | VAR_GLOBAL | | %MD1.0 | | | ☐ | ☐ | ☐ |
| | VAR_GLOBAL | | %MW1.4 | | | ☐ | ☐ | ☐ |
| | VAR_GLOBAL | TRUE: current PLC mode is ON | %MX1.2016.0 | | | ☐ | ☐ | ☐ |
| | VAR_GLOBAL | TRUE: current PLC mode is LOA | %MX1.2017.0 | | | ☐ | ☐ | ☐ |
| | VAR_GLOBAL | TRUE: current PLC mode is STO | %MX1.6.0 | | | ☐ | ☐ | ☐ |
| | VAR_GLOBAL | TRUE: current PLC mode is RUN | %MX1.7.0 | | | ☐ | ☐ | ☐ |
| | VAR_GLOBAL | TRUE: current PLC mode is HAL | %MX1.8.0 | | | ☐ | ☐ | ☐ |
| | VAR_GLOBAL | | %MD1.2000 | | | ☐ | ☐ | ☐ |
| | VAR_GLOBAL | | %MD1.2004 | | | ☐ | ☐ | ☐ |
| | VAR_GLOBAL | | %MD1.2008 | | | ☐ | ☐ | ☐ |
| | VAR_GLOBAL | | %MW1.2012 | | | ☐ | ☐ | ☐ |
| | VAR_GLOBAL | | %MW1.2016 | | | ☐ | ☐ | ☐ |
| | VAR_GLOBAL | TRUE: current PLC mode is PO.. | %MW1.2018.0 | | | ☐ | ☐ | ☐ |
| | VAR_GLOBAL | TRUE: one or more | %MW1.2019.0 | | | ☐ | ☐ | ☐ |
| | VAR_GLOBAL | TRUE: current PLC mode is PO.. | %MW1.2020.0 | | | ☐ | ☐ | ☐ |
| | VAR_GLOBAL | AI Channel 1 | %IB0 | | | ☐ | ☐ | ☐ |
| | VAR_GLOBAL | AI Channel 2 | %IB24 | | | ☐ | ☐ | ☐ |
| | ASSIGN IEC ADDRESS AUTOMATICALLY | | | | | | | |
| | VAR_GLOBAL | | | 1 | | ☐ | ☐ | ☐ |
| | VAR_GLOBAL | | | 1 | | ☐ | ☐ | ☐ |

FROM FIG. 3A-1

INPUT/OUTPUT (I/O) BINDING WITH AUTOMATIC INTERNATIONAL ELECTROMECHANICAL COMMISSION (IEC) ADDRESS GENERATION IN REMOTE TERMINAL UNIT (RTU) CONFIGURATION

TECHNICAL FIELD

This disclosure is generally directed to industrial process control and automation systems. More specifically, this disclosure is directed to input/output (I/O) binding with automatic International Electromechanical Commission (IEC) address generation in a remote terminal unit (RTU) configuration.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to an automation system. The automation system can execute control logic and alter the operations of actuators at the different sites via the RTUs. The RTUs themselves could also incorporate algorithms for data analytics. RTUs have increased in usage and complexity from their early designs in the 1970 s. Today, RTUs often need to reliably support a large set of application-specific network capabilities and protocols, as well as support a number of control execution models and provide smart device integration.

SUMMARY

This disclosure provides input/output (I/O) binding with automatic International Electromechanical Commission (IEC) address generation in a remote terminal unit (RTU) configuration.

In a first example, a method includes automatically assigning, by at least one processor, an IEC address to an I/O binding variable for an RTU. This includes identifying a type of the I/O binding variable and identifying a size of the I/O binding variable based on the identified type. The size represents a number of memory locations to be used to store the I/O binding variable in at least one memory of the RTU, and the size represents a number of bytes. This also includes, in response to determining that the at least one memory contains a free space to store the I/O binding variable based on the identified size, assigning the IEC address identifying the free space to the I/O binding variable.

In a second example, at least one processor configured to automatically assign an IEC address to an I/O binding variable for an RTU. The at least one processor is configured to identify a type of the I/O binding variable and identify a size of the I/O binding variable based on the identified type. The size represents a number of memory locations to be used to store the I/O binding variable in at least one memory of the RTU, and the size represents number of bytes. The at least one processor is also configured, in response to determining that the at least one memory contains a free space to store the I/O binding variable based on the identified size, to assign the IEC address identifying the free space to the I/O binding variable.

In a third example, a non-transitory computer readable medium embodies computer readable program code that, when executed by at least one processor, causes the at least one processor to automatically assign an IEC address to an I/O binding variable for an RTU. This includes identifying a type of the I/O binding variable and identifying a size of the I/O binding variable based on the identified type. The size represents a number of memory locations to be used to store the I/O binding variable in at least one memory of the RTU, and the size represents a number of bytes. This also includes, in response to determining that the at least one memory contains a free space to store the I/O binding variable based on the identified size, assigning the IEC address identifying the free space to the I/O binding variable.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 3A-1 and 3A-2 (together referred to herein as FIG. 3A) and FIGS. 3B-1 and 3B-2 (together referred to herein as FIG. 3B) illustrate example display screens of an IEC programming workspace including an IEC address automatically assigned to each I/O binding variable according to this disclosure;

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
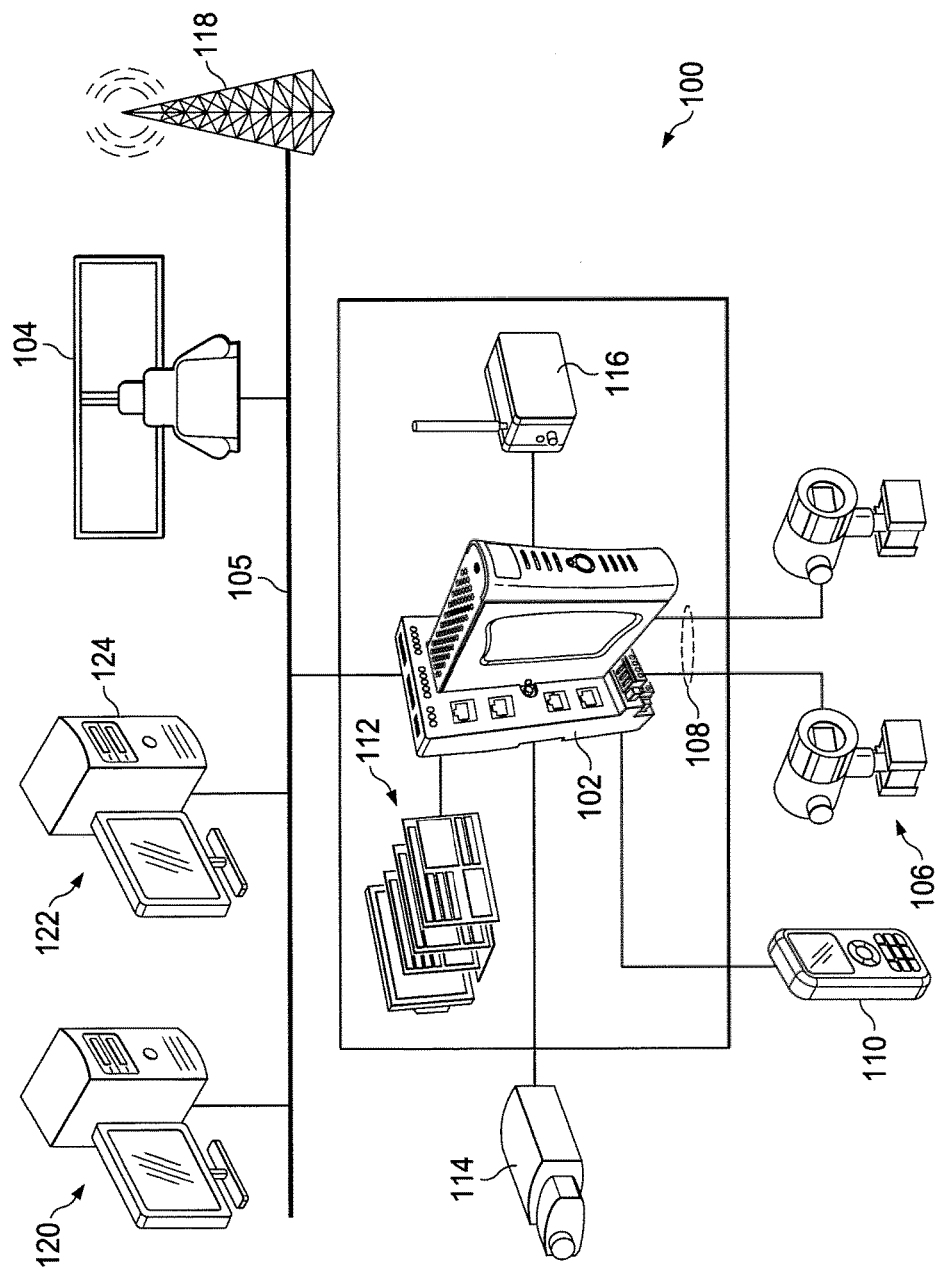
FIG. 1 illustrates an example industrial process control and automation system having a remote terminal unit (RTU) according to this disclosure.

FIG. 1 illustrates an example industrial process control and automation system 100 having a remote terminal unit (RTU) 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder machine 122. The FDM 120 can be used to configure and manage assets such as field devices (including the field devices 106), and the RTU builder machine 122 can be used to configure an RTU (including the RTU 102).

The RTU 102 has the ability to support a flexible mix of I/O channel types. For example, the channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Some RTUs 102 can achieve a desired mix of I/O channel types using I/O module that have a fixed number of inputs and outputs, where each input or output is fixed to a particular type. Other RTUs 102 can achieve a desired mix of I/O channel types using I/O module with reconfigurable inputs or outputs. Moreover, some RTUs 102 can be expandable so that one or more I/O modules (each with one or more I/O channels) can be used with the RTUs 102.

In some embodiments, the RTU builder machine 122 or other component can communicate with the RTU 102 in order to download the configuration and control logic. The relationship between the IO variable and IEC address is one part of the control logic. The compilation maps one or more I/O variables to one or more IEC addresses, which enables the RTU 102 to determine a link between each I/O variable and an I/O channel through a mutual link to the same IEC address. For example, firmware of the RTU 102 may include a mapping of I/O channels to IEC addresses, which can be used in combination with a downloaded or otherwise received compilation of relationship information. As a particular example, by receiving the compilation of relationship information, the RTU 102 can determine a particular I/O variable that is bound to a particular I/O channel through a particular IEC address.

Prior to transmitting the compilation of relationship information to the RTU 102, the RTU builder machine 122 or other component can generate the compilation of relationship information. In some embodiments, to facilitate the generation of a compilation, a user executes RTU configuration software that supports the IEC61131-3 standard, like the RTU BUILDER software from HONEYWELL INTERNATIONAL INC. on the RTU builder machine 122. The RTU configuration software that supports the IEC61131-3 standard may include at least two workspaces, including an IEC programming workspace and an RTU configuration workspace.

Certain RTU configuration software that supports the IEC61131-3 standard requires a user to manually assign an IEC address for each global variable. For an I/O binding variable, the user is required to assign an IEC address to the I/O binding variable after the I/O binding variable is bound to an I/O channel because the I/O binding variable belongs to a global variable. Due to human error, manual assignments of I/O binding variables to IEC addresses cause a series of problems. For example, the user may assign the wrong IEC address to an I/O binding variable, or the user may forget to assign an IEC address to an I/O binding variable. As a result of such human error, the I/O binding variable cannot obtain a correct I/O value. As another example, the process of manually assigning an IEC address includes not only typing an IEC address for each I/O binding variable into a table but also counting a number of address spaces that must be between a previously-assigned IEC address and another IEC address assignment. The count of the number of address spaces between two IEC address assignments depends on the type of I/O binding variable of the previously assigned IEC address, and the determination of this count manually is subject to additional human error.

According to this disclosure, a tool 124 that facilitates automatic assignment of IEC addresses for I/O binding variables is provided in the RTU builder machine 122 or other component. By using the tool 124 for I/O binding with automatic IEC address generation in an RTU configuration, the process of configuring I/O bindings in an RTU is easier, faster, and more accurate, and the risk of wrong operations is reduced. The tool 124 can use the IEC programming workspace within the RTU configuration software that supports the IEC61131-3 standard to automatically assign an IEC address to each I/O binding variable. More particularly, the tool 124 can determine the type of I/O binding variable and the size of the I/O binding variable, determine that at least one memory includes a free space large enough to contain the I/O binding variable, and assign an IEC address corresponding to the free space to the I/O binding variable upon the determination. Examples of I/O binding variable types include the following types: analog input, digital input, pulse input, analog output readback, digital output readback, analog output, and digital output. Each type of I/O binding variable can have a different size, such as when an analog input type has a size of 24, the digital input type has a size of 28, the digital output readback type has a size of 2, and the digital output type has a size of 1. Additional details regarding this functionality are provided below.

Although FIG. 1 illustrates one example of an industrial process control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being incorporated into the RTU builder machine 122, the tool 124 could be used with other systems or devices. In addition, FIG. 1 illustrates one example operational environment where an RTU 102 can be used. One or more RTUs could be used in any other suitable system.

Figure 2:
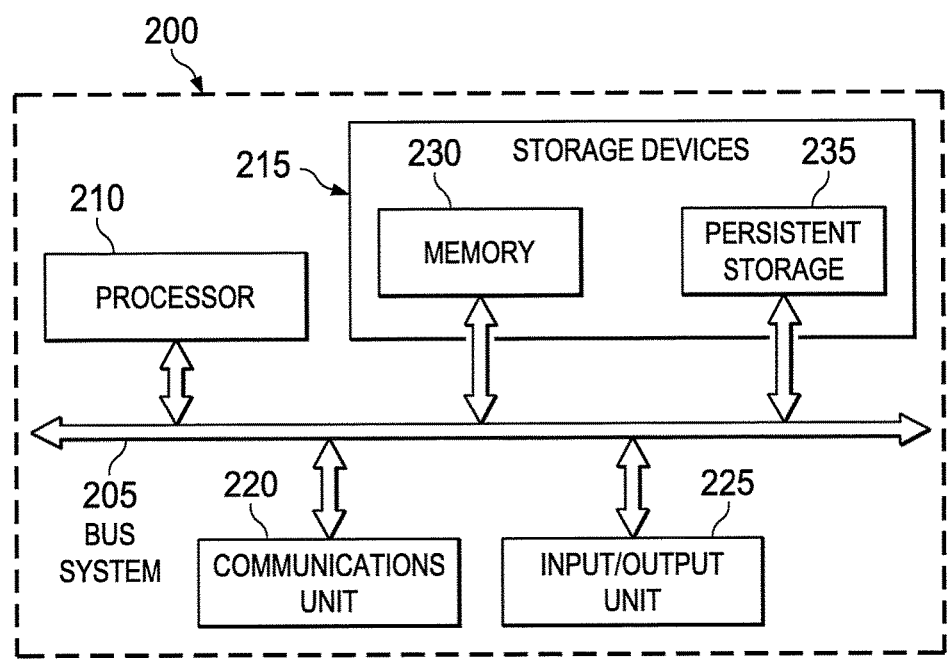
FIG. 2 illustrates an example device supporting input/output (I/O) binding with automatic International Electromechanical Commission (IEC) address generation in an RTU configuration according to this disclosure.

FIG. 2 illustrates an example device 200 supporting I/O binding with automatic IEC address generation in an RTU configuration according to this disclosure. The device 200 could, for example, represent the RTU 102. The device 200 could, for example, represent the RTU builder machine 122 or other computing device supporting I/O binding with automatic IEC address generation in an RTU configuration.

As shown in FIG. 2, the device 200 includes a bus system 205, which supports communication between at least one processor 210, at least one storage device 215, at least one communications unit 220, and at least one input/output (I/O) unit 225.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. The persistent storage 235 can be disposed on the same integrated circuit chip as the processor 210, and is accordingly described as "on-chip memory."

The communications unit 220 supports communications with other systems or devices. For example, the communications unit 220 could include a network interface card or a wireless transceiver facilitating communications over the network 105. The communications unit 220 may support communications through any suitable physical or wireless communication link(s). More particularly, the communications unit 220 could include a transmitter and a receiver for communicating with external devices.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a device 200 supporting I/O binding with automatic IEC address generation in an RTU configuration, various changes may be made to FIG. 2. For example, computing devices come in a wide variety of configurations. The device 200 shown in FIG. 2 is meant to illustrate one example type of computing device and does not limit this disclosure to a particular type of computing device.

Figures 1, 3A:
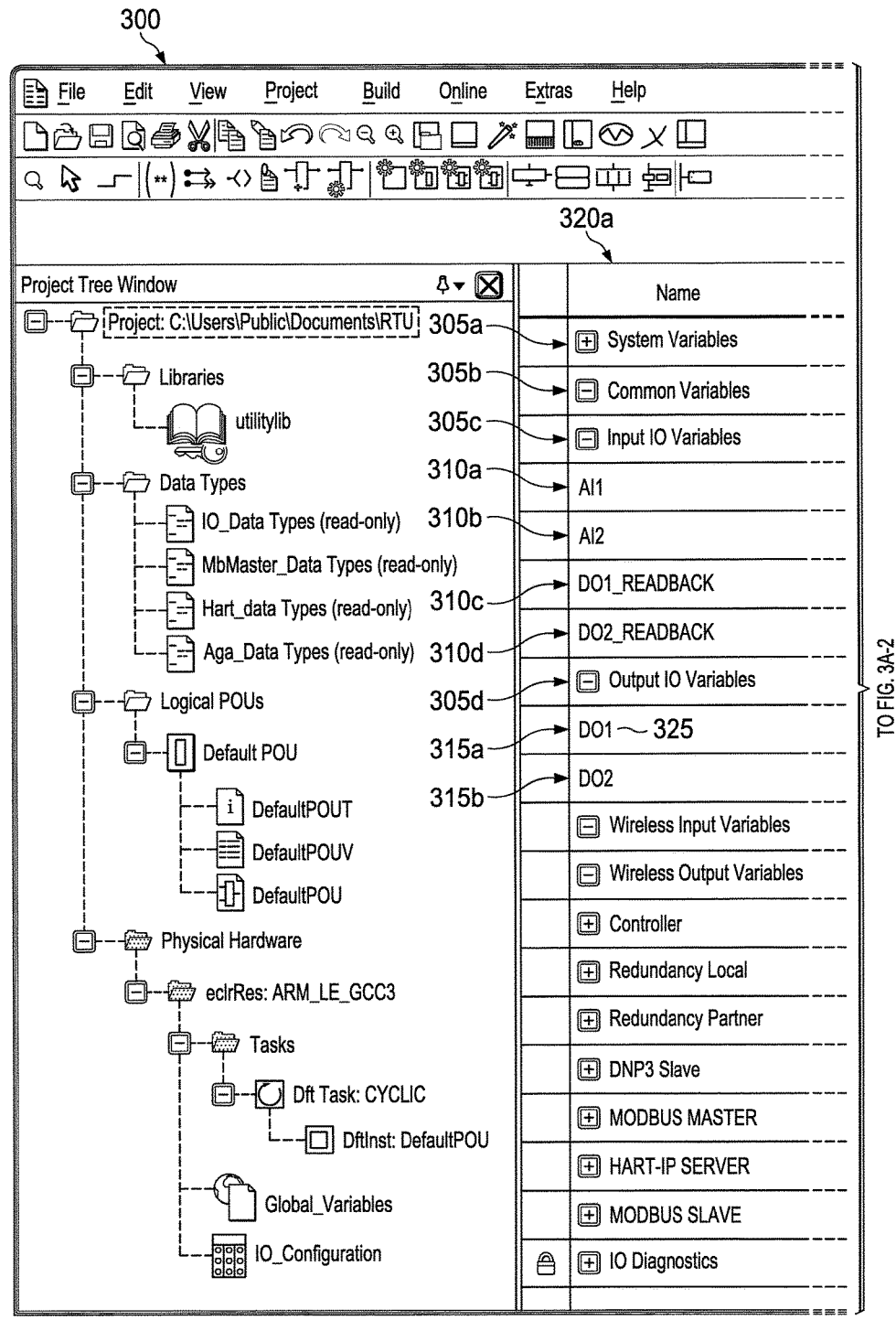
Figures 2, 3A:
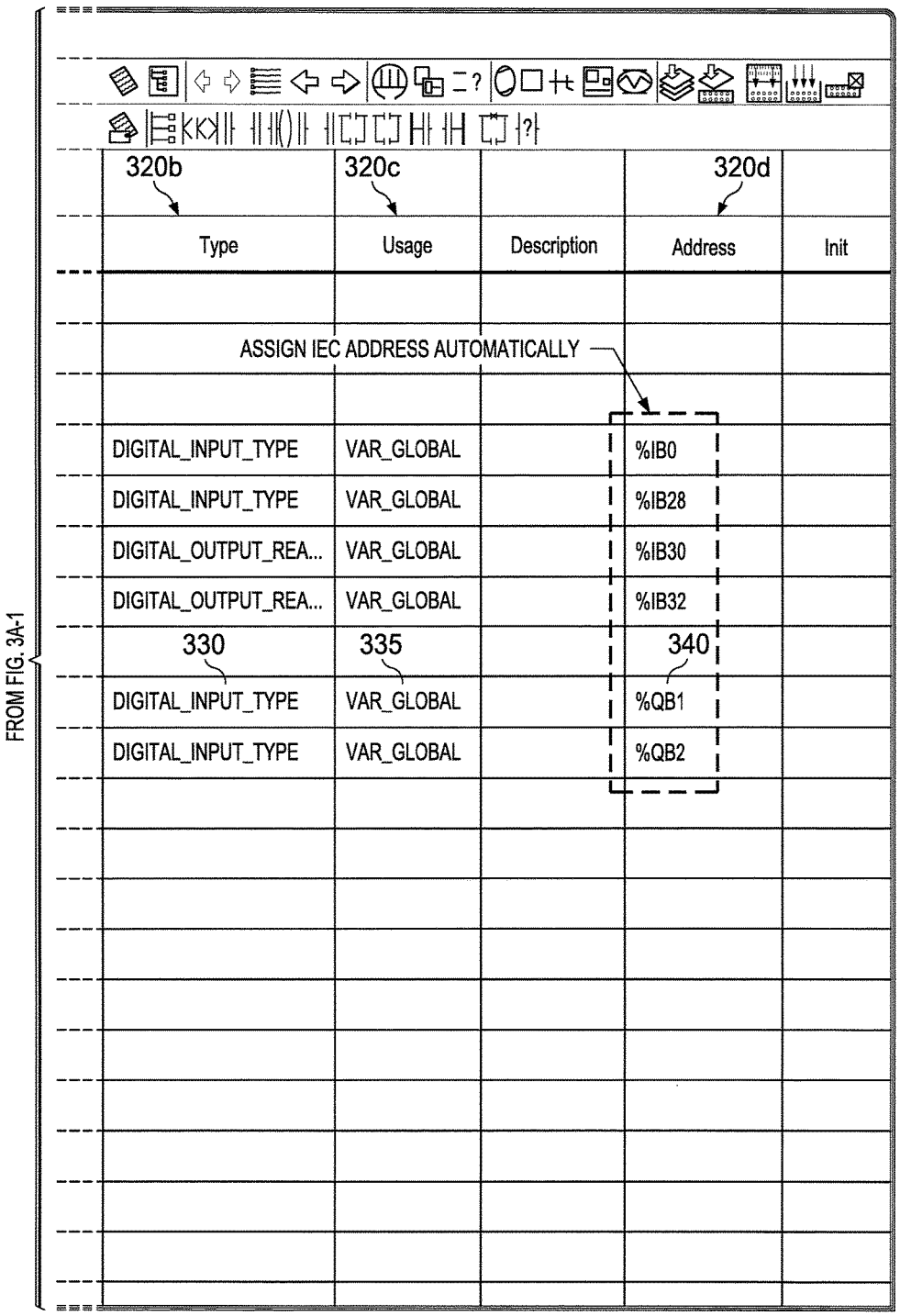
Figures 1, 3B:
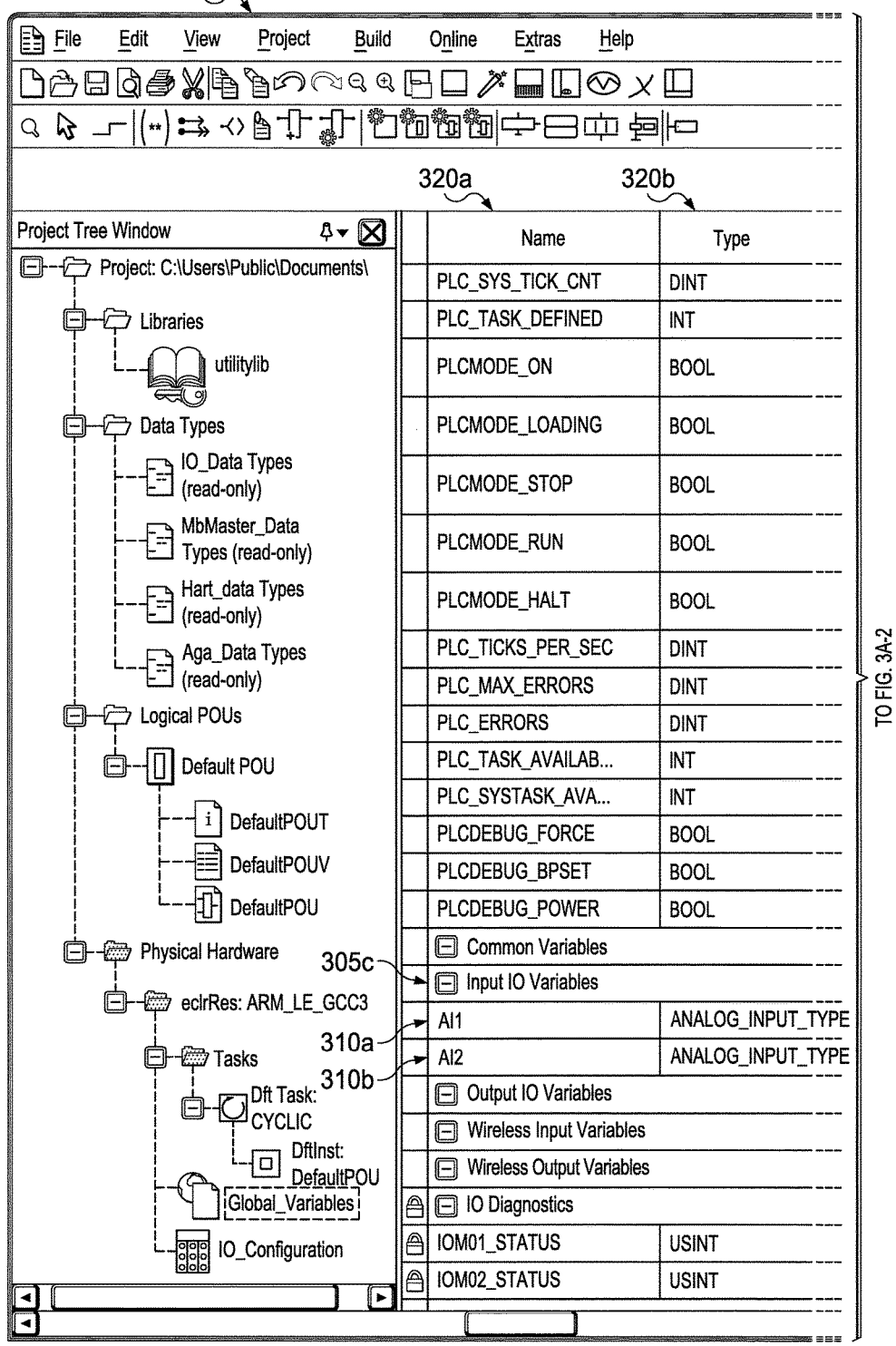

FIGS. 3A and 3B illustrate example display screens 300-301 of an IEC programming workspace including an IEC address automatically assigned to each I/O binding variable according to this disclosure. In some embodiments, the RTU builder machine 122 includes a display device that displays the screens 300-301. In particular embodiments, the tool 124 includes a suitable application for generating graphical displays representing the generation of a compilation of relationship information.

As shown in FIG. 3A, the display screen 300 includes a table having one or more expandable sections 305a-305d for various categories of data. For each expandable section 305a-305d, the table also includes multiple rows 310a-310d and 315a-315b and multiple columns 320a-320d. Each expandable section 305a-305d corresponds to a respective one of the following categories: System Variables, Common Variables, Input I/O Variables (namely, input I/O binding variables), and Output I/O Variables (namely, output I/O binding variables). The columns include a Name column 320a containing a name 325 of each I/O binding variable, a Type column 320b containing a type 330 of each I/O binding variable, a Usage column 320c that may contain an indicator 335 (VAR_GLOBAL) that an I/O binding variable is used as a global variable, and an Address column 320d containing an IEC address 340 automatically assigned to an I/O binding variable.

In response to a selection to add a new variable, the tool 124 adds a row to the table. The tool 124 can create an I/O binding variable in response to receiving a request with variable name to add a new variable. The tool 124 can also enable a user to insert (such as by typing or pasting text) a custom name into the Name column 320a for a variable. As an example, a custom name of an input I/O binding type variable could be "AI1" or "AI2" as shown in the display screen 300. Also, generic name of a digital output readback type variable could be "DO1_READBACK" or "DO2_READBACK".

After the tool 124 adds a row to the table, the tool 124 prompts the user to select a type of I/O binding variable in the Type column 320b. For example, the tool 124 could cause the display screen 300 to show a drop-down list of various types of I/O binding variables according to the category of the section 305a-305d. As a particular example, for a new variable added to the Input I/O Variables section 305c, the tool 124 may cause the display screen 300 to show a drop-down list including types such as analog input, digital input, and digital output readback. As another particular example, for a new variable added to the Output I/O Variables section 305d, the tool 124 may cause the display screen 300 to show a drop-down list including types such as analog output and digital output. In a similar manner, in the usage column 320c, the usage type can be selected for each row in the table.

In some embodiments, the user may not be required to input any information to the Address column 320d. Instead, the tool 124 can automatically (without human intervention) assign an IEC address to each I/O binding variable that does not have an IEC address. For example, the tool 124 can check the Address column 320d for empty cells as an indicator of which row 310a-310d, 315a-315b has an I/O binding variable without an IEC address. In particular embodiments, in response to receiving a selection to compile a project, the tool 124 can automatically assign an IEC address to each I/O binding variable without an IEC address. The selection to compile a project can be a user selection to "make" or "rebuild" the project. Also, in particular embodiments, in response to determining the type of an I/O bonding variable without an IEC address, the tool 124 can automatically generate and assign an IEC address to each I/O binding variable without an IEC address.

IEC addresses have a standard syntax. For example, the IEC address can begin with a percent sign (%) followed by a direction symbol, such as "I" for the input direction or "Q" for the output direction. The direction symbol is followed by a variable type symbol, such as "B" representing a data type. The last part of the IEC address can be the address number, such as "0" for a first address location within a memory, "1" for a second address location within a memory, and so on.

As shown in the display screen 301 of an IEC programming workspace of FIG. 3B, the Input I/O Variables section 305c can include different types of I/O variables, each having its own size. Examples here include ANALOG_INPUT_TYPE variables named AI1 and AI2, which have a size of 24 and are automatically assigned IEC addresses % IB0 and % IB24, respectively. The input I/O binding variable AI1 would occupy IEC addresses % IB0 through % IB23, and the input I/O binding variable AI2 would occupy IEC addresses % IB24 through % IB47.

Although FIGS. 3A and 3B illustrate examples of display screens 300-301 of an IEC programming workspace including an IEC address automatically assigned to each I/O binding variable, various changes may be made to FIGS. 3A and 3B. For example, the content and arrangement shown in each figure is for illustration only.

Figure 4:
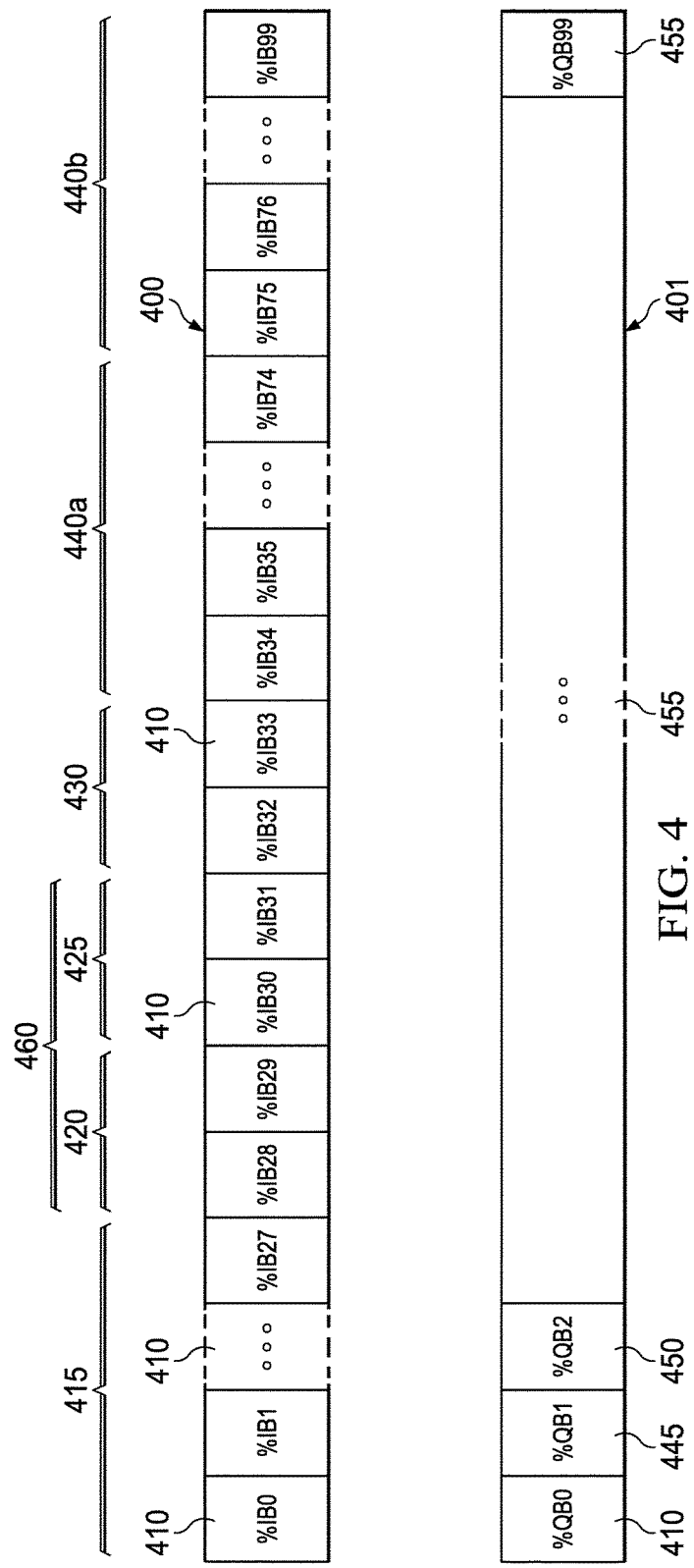
FIG. 4 illustrates example memory blocks for I/O binding variables according to this disclosure.

FIG. 4 illustrates example memory blocks 400-401 for I/O binding variables according to this disclosure. As an example, the memory blocks 400-401 could denote memory locations in one or more of the storage devices 215 of FIG. 2.

As shown in FIG. 4, the RTU 102 can include a first memory block 400 for storing input I/O variables and a second memory block 401 for storing output I/O variables. Each memory block 400-401 includes multiple memory locations 410 for storing information, and each memory location 410 can be assigned individually or as part of a sub-block. Each memory location 410 can store a byte of data. Any suitable number of memory locations 410 could be used in each memory block 400-401, such as one hundred memory locations. For simplicity, the memory blocks 400-401 will be described as storing the I/O binding variables configured in the display screen 300-301 of the IEC programming workspace. It is understood that the memory blocks 400-401 can store additional types of information and other I/O variables.

For each I/O binding variable in the Input I/O Variables section 305c, the tool 124 automatically reserves a sub-block of memory within the first memory block 400. Each sub-block can be identified by the first IEC address in that sub-block. As an example, when the first memory block 400 is empty, a sub-block 415 identified by the IEC address % IB0 of its first space can be assigned to the first I/O binding variable (AI1). The tool 124 accesses information indicating that the ANALOG_INPUT_TYPE has a size of 28, so the tool 124 reserves the sub-block 415 that includes memory locations 410 from % IB0 to % IB27. A sub-block 420 identified by the IEC address % IB28 of its first space can be assigned to the second I/O binding variable (AI2). The tool 124 accesses information indicating the size of the second I/O binding variable (AI2) based on its I/O binding variable type. As shown in the display screen 300, the second I/O binding variable (AI2) has a variable size of 2, so the sub-block 420 includes two memory locations 410 from % IB28 to % IB29. The tool 124 accesses information indicating the size of the third and fourth I/O binding variables (DO1_READBACK and DO2_READBACK) based on corresponding I/O binding variable types. As shown in the display screen 300, the third I/O binding variable (DO1_READBACK) has a variable size of 2, so a sub-block 425 includes two memory locations 410 from % IB30 to % IB31. In a similar manner, the tool 124 reserves the two memory locations 410 within a sub-block 430 for the fourth I/O binding variable (DO2_READBACK) from % IB32 to % IB33. The tool 124 may consume the remainder of the memory locations 410 in the first memory block 400 by reserving subsequently assigned sub-blocks 440a-440b for other input I/O binding variables.

In a similar manner, for each I/O binding variable in the Output I/O Variables section 305d, the tool 124 automatically reserves a sub-block of memory within the second memory block 401. As an example, when the second memory block 401 is empty except for information being stored at IEC address % QB0, a sub-block 445 identified by the IEC address % QB1 can be assigned to the first I/O binding variable (DO1). The tool 124 accesses information indicating that the DIGITAL_OUTPUT_TYPE has a variable size of 1, so the tool 124 reserves the sub-block 445 at a memory location 410 with an address of % QB1. The sub-block 450 identified by an IEC address % QB2 of its first space can be assigned to the second I/O binding variable (DO2). The tool 124 accesses information indicating the size of the second I/O binding variable (DO2) based on its I/O binding variable type. As shown in the display screen 300, the second I/O binding variable (DO2) has a variable size of 1, so the sub-block 450 includes one memory location 410 at the address % QB2. The tool 124 may consume the remainder of the spaces 410 in the second memory block 401 by reserving subsequently assigned sub-blocks for other output I/O binding variables. Alternatively, the tool 124 may determine that the remaining spaces in the second memory block 401 are free spaces 455 that are empty or not assigned.

When an I/O binding variable is deleted, the sub-block previously reserved for that I/O binding variable is also deleted, so the corresponding memory location(s) 410 become(s) free space. It may be difficult for a user to look at the address column 320d and manually determine which memory locations 410 are free, especially when the free memory locations are located between other sub-blocks that are not free. However, the tool 124 can easily determine that an I/O binding variable has been deleted and identify its memory location(s) for subsequent assignment. As a specific example, the tool 124 can determine that the second and third input I/O binding variables (AI2 and DO1_READBACK) have been deleted and determine that the memory locations 410 of the sub-blocks 420 and 425 are free or otherwise available to be re-assigned.

Later, when a new I/O binding variable is added, the tool can determine whether the memory block(s) 400-401 have suitable free space, depending on the type and size of the new I/O variable. If the size of the new I/O binding variable is less than or equal to the number of free spaces having consecutive address numbers, the tool 124 can assign the first IEC address of the free space to the new I/O binding variable. The tool 124 can also reserve the corresponding sub-block having the necessary number of memory locations 410 for the new I/O variable.

Although FIG. 4 illustrates one example of memory blocks 400-401 for I/O binding variables, various changes may be made to FIG. 4. For example, each of the memory blocks can include a different number of memory locations 410 or can include IEC addresses ordered differently.

Figure 5:
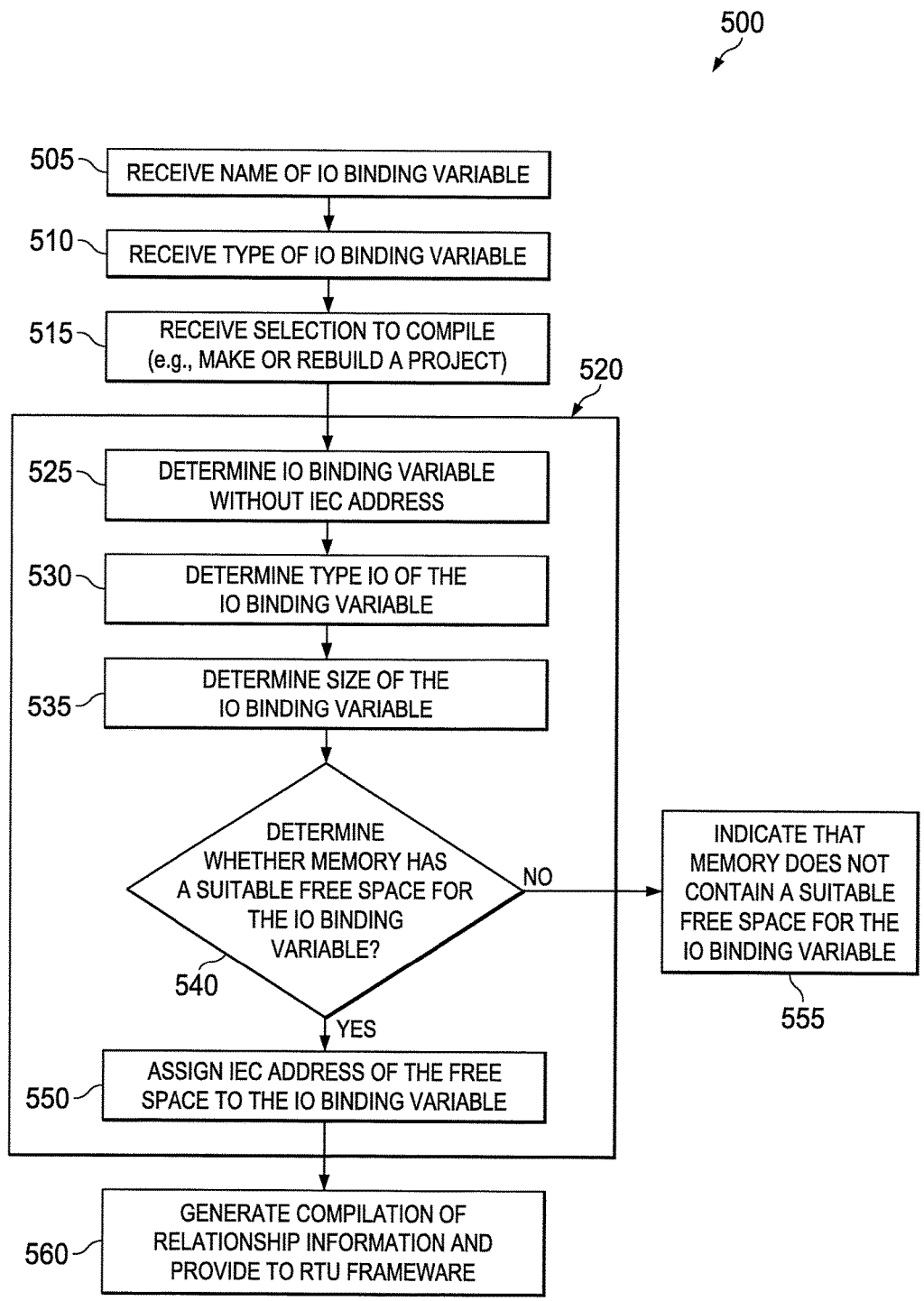
FIG. 5 illustrates an example process of I/O binding with automatic IEC address generation in an RTU configuration according to this disclosure.

FIG. 5 illustrates an example process 500 of I/O binding with automatic IEC address generation in an RTU configuration according to this disclosure. In some embodiments, the process 500 can be implemented by the processor(s) 210 within the device 200 of FIG. 2. As a particular example, the process 500 can be implemented by the RTU builder machine 122 using the tool 124, although the process 500 could be performed on any other suitable device.

In block 505, the tool 124 determines a name of an I/O binding variable. For example, the tool 124 can create an I/O binding variable in response to receiving a request with variable name to add a new variable. More particularly, the user can input a variable name in the IO binding page of the RTU configuration workspace, and then the new I/O variable will be created in IEC programming workspace automatically As another example, the tool 124 could receive a name of an I/O binding variable from custom text input to a field in the Name column 320a, such as when a user types or pastes a custom name into the Name column 320a for a variable. In block 510, the tool 124 receives a type of the I/O binding variable. The tool 124 could identify the type in any suitable manner, such as based on the section of a table in which the I/O binding variable is being identified.

In block 515, the tool 124 receives a selection to compile a project. For example, the selection to compile can be a selection to "make" a project or a selection to "rebuild" a project. In block 520, the tool 124 automatically assigns an IEC address to an I/O binding variable. For example, the tool 124 can automatically assign an IEC address to each I/O binding variable without an IEC address. In this embodiment, the tool 124 automatically assigns an IEC address to an I/O binding variable in response to receiving the selection to compile, although this could be done in response to other actions.

Block 520 here includes blocks 525-550. In block 525, the tool 124 determines a number of I/O binding variables without an IEC address assigned to the variable(s). In block 530, the tool 124 determines the type of each I/O binding variable, which could be done for all binding variables or only those lacking an IEC address. In block 535, the tool 124 determines the size of each I/O binding variable, which again could be done for all binding variables or only those lacking an IEC address. The size of a binding variable can be based on the determined type for that binding variable. In block 540, the tool 124 determines whether at least one memory has a suitable free space for each I/O binding variable, which again could be done for all binding variables or only those lacking an IEC address. For instance, the tool 124 could check the memory blocks 400-401 for suitable free space, such as by checking the memory block 400 for space for input binding variables and by checking the memory block 401 for space for output binding variables. If so, the process 500 proceeds to block 550. If not, the process 500 proceeds to block 555.

In block 550, the tool 124 assigns an IEC address of the free space to an I/O binding variable. For example, the tool 124 can reserve a sub-block having the same number of memory locations 410 as the size of the I/O binding variable without an IEC address and assign the first IEC address of the reserved sub-block to the I/O binding variable. Note that the process of assigning an IEC address can include using an IEC address standard syntax according to the determined type of I/O binding variable.

In block 555, the tool 124 indicates that the memory does not contain a suitable free space for the I/O binding variables. For example, the tool 124 could generate a display screen of an HMI that provides a visual indicator of which I/O binding variable(s) could not be assigned an IEC address due to memory constraints. The indicator of which I/O binding variable(s) could not be assigned an IEC address could be generated and output as a visual indicator, an audio indicator, or other forms for notifying an operator.

In block 560, the tool 124 generates a compilation of relationship information and provides the compilation to an RTU 102. For example, the tool 124 could generate a table of the names of the I/O binding variables and their corresponding IEC addresses (including addresses that were automatically assigned). The compilation of relationship information is not limited to a table format and could be any suitable format to notify an RTU 102 of the links between I/O binding variables and IEC addresses.

Although FIG. 5 illustrates one example of a process 500 of I/O binding with automatic IEC address generation in an RTU configuration, various changes may be made to FIG. 5. For example, while shown as a series of steps, various steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying, by at least one procesesor, that an input/output (I/O) binding variable for a remote terminal unit (RTU) does not have an assigned International Electromechanical Commission (IEC) address; and
   automatically assigning, by the at least one processor, an IEC address to the I/O binding variable by:
      identifying a type of the I/O binding variable;
      identifying a size of the I/O binding variable based on the identified type, the size representing a number of memory locations to be used to store the I/O binding variable in at least one memory of the RTU; and
      in response to determining that the at least one memory contains a free space to store the I/O binding variable based on the identified size, assigning the IEC address identifying the free space to the I/O binding variable.

2. The method of claim 1, further comprising:
   generating a compilation of relationship information that links the IEC address to the I/O binding variable; and
   transmitting the compilation of relationship information to the RTU.

3. The method of claim 1, wherein:
   the method further comprises receiving a selection to compile a project; and
   automatically assigning the IEC address to the I/O binding variable comprises automatically assigning the IEC address to the I/O binding variable in response to receiving the selection to compile the project.

4. The method of claim 1, further comprising:
   identifying a name of the I/O binding variable.

5. The method of claim 4, further comprising one of:
   receiving the name of the I/O binding variable from a user; and
   generating the name of the I/O binding variable.

6. The method of claim 1, wherein the I/O binding variable comprises one of a plurality of I/O binding variables.

7. The method of claim 1, further comprising:
   in response to determining that the at least one memory does not contain a free space to store a second I/O binding variable based on an identified size of the second I/O binding variable, generating and outputting an indicator identifying that the second I/O binding variable could not be assigned an IEC address.

8. An apparatus comprising:
   at least one processor configured to automatically assign an International Electromechanical Commission (IEC) address to an input/output (I/O) binding variable for a remote terminal unit (RTU);
   wherein the at least one processor is configured to:
      identify that the I/O binding variable does not have an assigned IEC address;
      identify a type of the I/O binding variable;
      identify a size of the I/O binding variable based on the identified type, the size representing a number of memory locations to be used to store the I/O binding variable in at least one memory of the RTU; and
      in response to determining that the at least one memory contains a free space to store the I/O binding variable based on the identified size, assign the IEC address identifying the free space to the I/O binding variable.

9. The apparatus of claim 8, wherein the at least one processor is further configured to:
   generate a compilation of relationship information that links the IEC address to the I/O binding variable; and
   initiate transmission of the compilation of relationship information to the RTU.

10. The apparatus of claim 8, wherein:
    the at least one processor is further configured to receive a selection to compile a project; and
    the at least one processor is configured to automatically assign the IEC address to the I/O binding variable in response to receiving the selection to compile the project.

11. The apparatus of claim 8, wherein the at least one processor is further configured to identify a name of the I/O binding variable.

12. The apparatus of claim 11, wherein the at least one processor is configured to one of:
    receive the name of the I/O binding variable from a user; and
    generate the name of the I/O binding variable.

13. The apparatus of claim 8, wherein the I/O binding variable comprises one of a plurality of I/O binding variables.

14. The apparatus of claim 8, wherein the at least one processor is further configured, in response to determining that the at least one memory does not contain a free space to store a second I/O binding variable based on an identified size of the second I/O binding variable, to generate and output an indicator identifying that the second I/O binding variable could not be assigned an IEC address.

15. A non-transitory computer readable medium embodying computer readable program code that, when executed by at least one processor, causes the at least one processor to:
    identify that an input/output (I/O) binding variable for a remote terminal unit (RTU) does not have an assigned International Electromechanical Commission (IEC) address; and
    automatically assign an IEC address to the I/O binding variable by:

identifying a type of the I/O binding variable;
identifying a size of the I/O binding variable based on the identified type, the size representing a number of memory locations to be used to store the I/O binding variable in at least one memory of the RTU; and
in response to determining that the at least one memory contains a free space to store the I/O binding variable based on the identified size, assigning the IEC address identifying the free space to the I/O binding variable.

16. The non-transitory computer readable medium of claim 15, wherein the computer readable program code, when executed by the at least one processor, further causes the at least one processor to:
generate a compilation of relationship information that links the IEC address to the I/O binding variable; and
transmit the compilation of relationship information to the RTU.

17. The non-transitory computer readable medium of claim 15, wherein the computer readable program code, when executed by the at least one processor, further causes the at least one processor to:
receive a selection to compile a project; and
automatically assign the IEC address to the I/O binding variable in response to receiving the selection to compile the project.

18. The non-transitory computer readable medium of claim 15, wherein the computer readable program code, when executed by the at least one processor, further causes the at least one processor to:
identify a name of the I/O binding variable.

19. The non-transitory computer readable medium of claim 18, wherein the computer readable program code, when executed by the at least one processor, further causes the at least one processor to one of:
receive the name of the I/O binding variable from a user; and
generate the name of the I/O binding variable.

20. The non-transitory computer readable medium of claim 15, wherein the I/O binding variable comprises one of a plurality of I/O binding variables.

* * * * *